SIGNAL AT VARIOUS INPUT ANGLES
Fig. 8.
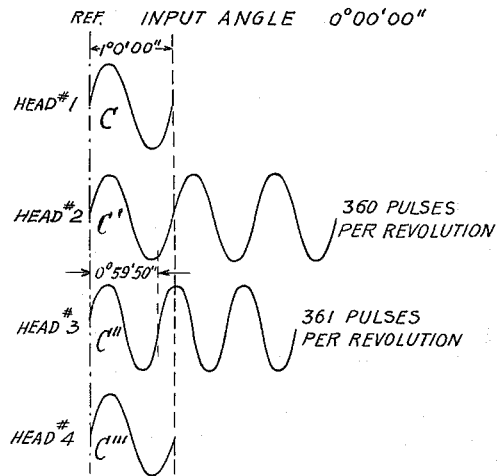
Fig. 9.
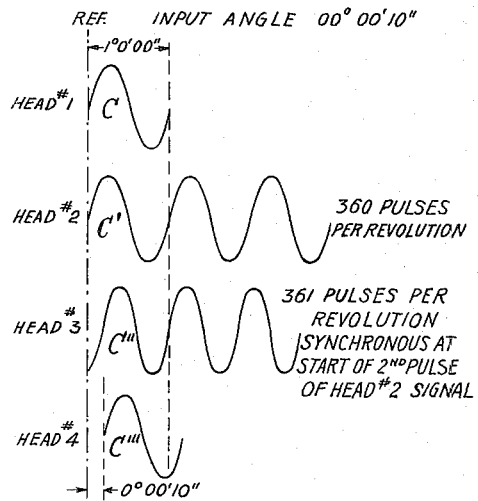
Fig. 10.
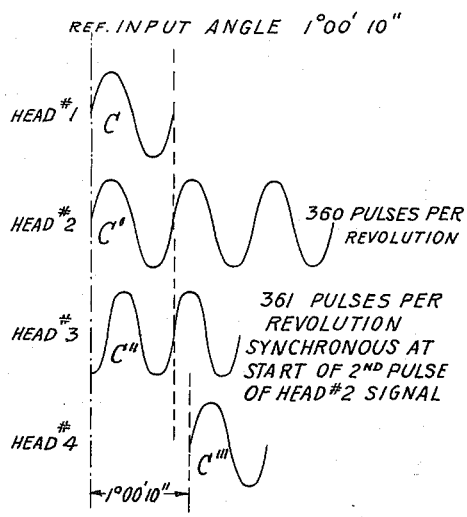
Fig. 11.
| TRANSDUCER OUTPUT | | |
|---|---|---|
| INPUT ANGLE | PULSES PER UNIT TIME INTERVAL | |
| | COARSE CHANNEL | FINE CHANNEL |
| 00° 00' 00" | 0 | 0 |
| 00° 00' 10" | 0 | 1 |
| 01° 00' 00" | 1 | 0 |
| 01° 00' 10" | 1 | 1 |
| 01° 00' 20" | 1 | 2 |
| 01° 01' 00" | 1 | 6 |
| 01° 59' 50" | 1 | 359 |
| 359° 59' 50" | 359 | 359 |
INVENTOR
*Robert C. Rosaler*
BY
*his* ATTORNEY Sept. 28, 1965     R. C. ROSALER     3,208,274
APPARATUS FOR MEASURING ANGULAR DISPLACEMENT
OF A ROTATABLE MEMBER BY ELECTRONIC MEANS
Filed Nov. 5, 1959     4 Sheets-Sheet 4

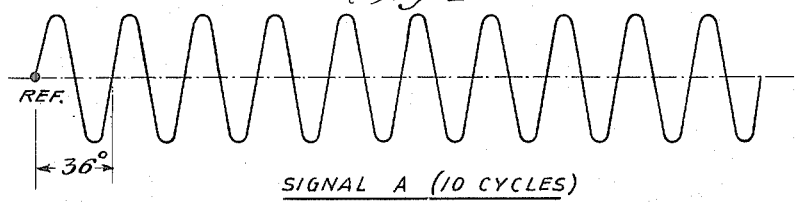
SIGNAL A (10 CYCLES)
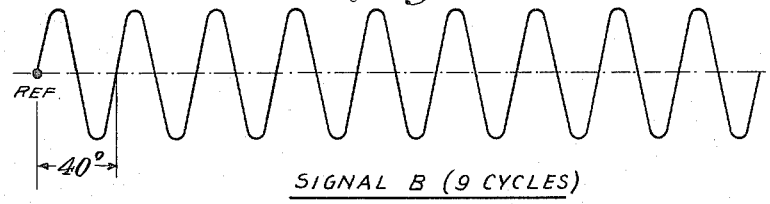
SIGNAL B (9 CYCLES)
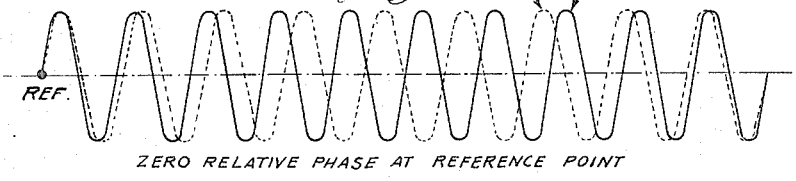
ZERO RELATIVE PHASE AT REFERENCE POINT
ZERO TORQUE
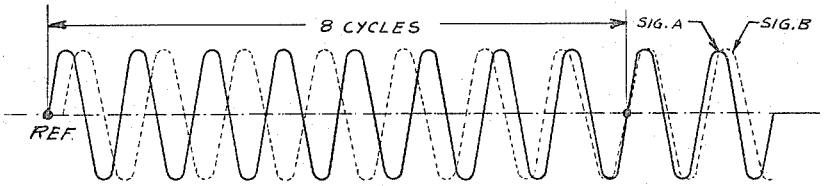
ZERO RELATIVE PHASE AT 8$^{TH}$ CYCLE
100% TORQUE
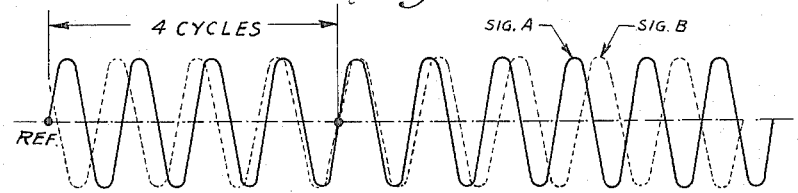
ZERO RELATIVE PHASE AT 4$^{TH}$ CYCLE
50% TORQUE
INVENTOR
Robert C. Rosaler

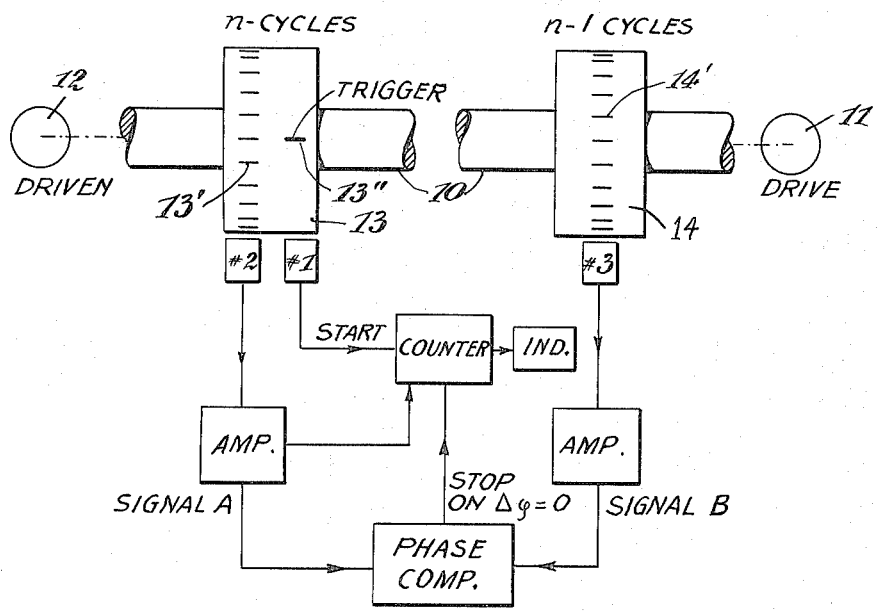
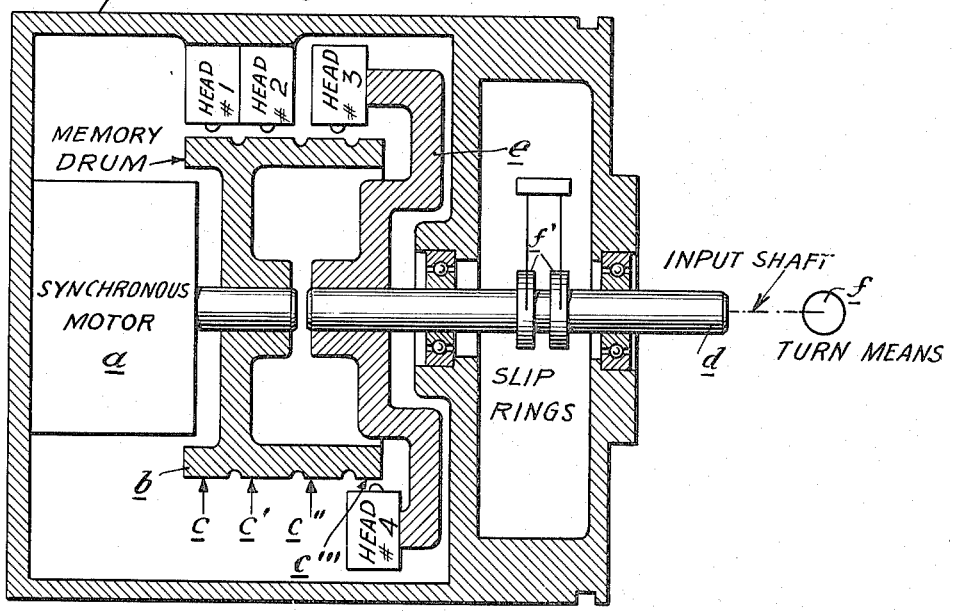

INVENTOR
Robert C. Rosaler
BY Michael S. Striker
his ATTORNEY

United States Patent Office 3,208,274
Patented Sept. 28, 1965

3,208,274
APPARATUS FOR MEASURING ANGULAR DISPLACEMENT OF A ROTATABLE MEMBER BY ELECTRONIC MEANS
Robert C. Rosaler, Ardsley, N.Y., assignor to Pitometer Log Corporation, New York, N.Y.
Filed Nov. 5, 1959, Ser. No. 851,049
4 Claims. (Cl. 73—136)

The present invention concerns an apparatus for measuring an angular displacement of a rotatable member by electronic means and by comparison of frequencies influenced by such angular displacement.

The invention is advantageously applicable in various ways. One useful application is the measurement of physical angles of turn of a rotatable member in such a manner that electrical pulses are obtained which are indicative of the angle to be measured and can be transmitted as such an indication over distances and applied to other instruments that are to be controlled or influenced in some manner depending upon the angle measured. Another useful application of the invention is the measurement of a twist angle appearing in a torque-transmitting rotatable member in which case the angle measured is the angular displacement of one portion of the rotatable member relative to another portion of that member.

It is therefore a main object of the invention to provide for an apparatus for carrying out such angular measurements with extreme accuracy and reliability.

It is a further object of this invention to provide a means for carrying out such measurements, the method and the apparatus being comparatively simple and inexpensive if compared with the results achieved thereby.

With above objects in view, measuring an angular displacement of a rotatable member, according to the invention, comprises broadly the the steps of generating by operation of first generating means a first current having a first frequency in a fixed proportion to the rotary speed of the rotatable member; generating by operation of second generating means a second current having a second frequency in a second fixed proportion to said rotary speed, said second frequency differing from said first frequency by one full cycle, and said first and second frequencies being in phase with each other at one instant of each revolution of said rotatable member, said instant being used as a time reference point; shifting the relative position of one of said generating means with respect to the other one of said generating means an angular amount by turning movement about the axis of said rotatable member for shifting the moment of phase equality between said frequencies; and counting the number of full cycles of said first current occurring between said time reference point and said shifted moment of phase equality, said number of full cycles being in proportion to said angular amount of turn to be measured.

In another aspect of this invention, an arrangement for measuring an angular displacement of a member comprises, in combination, two systems for generating electric currents having frequencies, respectively, differing slightly from each other and being in phase with each other at one periodically recurring instant constituting a time reference point, each of said systems including a pulse creating means for creating pulses at the frequency of the respective system, and pick-up means cooperating with said respective pulse creating means; two rotatable co-axially arranged support elements, each carrying one of said means of one of said systems, respectively, the other means of the respective system being arranged adjacent to said one means of the respective system for cooperation therewith so as to create during rotation of said support elements at equal speed said currents at slightly different frequencies; means for varying the phase-determining relationship between said systems by causing an angular displacement of one of said support elements relative to the other, resulting in a shift of the moment of phase equality between said currents of different frequencies; and means for determining the number of full cycles of one of said currents between said time reference point and said shifted moment of phase equality between said currents, said number of full cycles being an indication of the amount of said angular displacement of one of said support elements relative to the other one thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1–5 are diagrams of signals and signal combinations occurring in carrying out the method according to the invention;

FIG. 6 is a diagrammatic illustration of an application of the invention to measuring the twist angle occurring in a toque-transmitting shaft, the pertaining signals and signal combinations being illustrated by FIGS. 1 to 5;

FIG. 7 is a diagrammatic sectional view of an apparatus for measuring angular displacements of a rotatable member;

FIGS. 8–11 are diagrammatic and tabular illustrations of signals and signal relationships obtained in carrying out the method according to the invention, and obtainable from the apparatus shown in FIG. 7.

Figure 12:
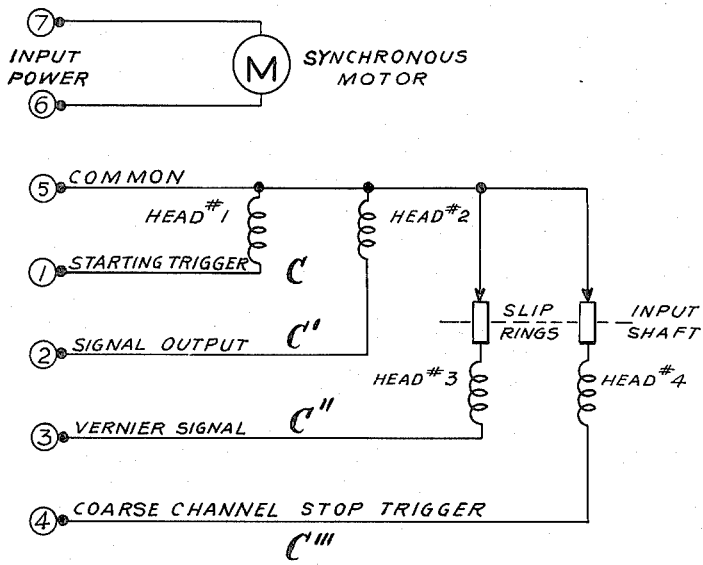
FIGS. 12 and 13 are schematic circuit diagrams relating to the apparatus illustrated in FIG. 7.

It will be seen below from the description of certain embodiments of the invention that in these embodiments currents and signals of predetermined frequencies are produced by the rotation of a signal carrier provided with a signal track cooperating with corresponding pick-up means. It should be understood that the method according to the invention offers the great advantage that amplitude variations of the signals have practically no effect on the results. Such amplitude variations may be caused easily if the rotating signal carrier carries a track which is not accurately concentric with the axis of rotation.

Referring now to FIGS. 1–6, a shaft 10 is driven by drive means 11 for transmitting a torque to a driven member 12. A signal carrier 13 and a signal carrier 14 are mounted at a predetermined distance from each other in axial direction of the shaft 10 on the latter and, being drum-shaped in this example, carry on their cylindrical peripheral surface recorded signals which may be picked-up during the rotation of the shaft 10 by corresponding pick-up heads #1, #2, and #3. The signal carrier drum 13 is provided with a track 13′ for generating through the associated pick-up head #2 a signal A of $n$ cycles per revolution of the shaft 10. On the same signal carrier drum 13 is provided a single signal record 13″ in axial alignment with one of the signal marks of the track 13′ and adapted to generate through the associated pick-up head #1 a single trigger signal per revolution of the shaft 10. Similarly, the second signal carrier drum 14 is provided with a second signal track 14′ which generates through the pick-up head #3 a second signal containing $n-1$ cycles per revolution of the shaft 10. The signal marks in the track 14′ are so arranged that when the shaft 10 is at standstill and not subjected to a torque, one of the signal marks of the track 14′ is in alignment axially with the above mentioned trigger signal mark 13″.

FIG. 1 illustrates the signal A as obtained during one revolution of the signal carrier 13, the number $n$ of cycles produced during one revolution being chosen to be 10 cycles. FIG. 2 illustrates correspondingly the signal B obtained during one revolution of the drum 14. The signal B contains 9 cycles per revolution. The reference point marked at the left-hand end of the signals A and B illustrates the start of that particular cycle or pulse which would coincide with the pulse of the trigger signal derived from the signal mark 13″. FIG. 3 shows the signals A and B superimposed over each other and it can be seen that the two signals are in phase with each other only at the above mentioned reference point. This condition can only prevail where there is no torque transmitted through the shaft 10, or at least if there is no twist appearing in the shaft between the locations of the drums 13 and 14.

If during the torque-transmitting rotation of the shaft 10 a twist should develop in the shaft between the drums 13 and 14, which would result in an angular displacement of the drum 14 with respect to the drum 13, then the signal obtained from the track 14′ will be shifted along the time axis as can be seen from FIGS. 4 and 5. Consequently the moment of phase equality between the two signals A and B will be shifted away from the original time reference point an amount which can be measured in terms of full cycles of the signal A and will be proportional to the angle of twist or, in other words, the angular displacement of the signal carrier drum 14 with respect to the signal carrier drum 13. In the example of FIG. 4, the shift amounts to eight full cycles. Matters can be arranged in such a manner that this amount of eight cycles would correspond to 100% torque. FIG. 5 illustrates an example where the amount of torque and corresponding twist angle is only one-half that illustrated by FIG. 4 and may therefore be termed 50% torque. In this case of course the shift of the point of phase equality is four cycles from the time reference point.

In order to determine the amount of twist angle or torque in terms of full cycles of the signal A occurring between the original time reference point and the shifted moment of phase equality between the two signals, a circuit arrangement as illustrated by FIG. 6 may be used. The signals A and B are respectively transmitted from the corresponding pick-up heads #2 and #3 via suitable amplifiers to a phase comparator device of conventional type which is adapted to furnish a pulse whenever the phase comparison shows zero relative phase between the two input frequencies. The trigger signal is transmitted from the pick-up head #1 to a counter device of a conventional type which is also supplied with an input of the signal A. The counter is started by the trigger signal so as to count the full cycles of the signal A starting from the time reference point, and the counter will be stopped by the above mentioned pulse issued by the phase comparator whenever phase equality or zero relative phase between signal A and signal B occurs. As mentioned above the count of the full cycles between the start and stop of the counter action is indicative of the angular displacement of the signal carrier drum 14 with respect to the position of the signal carrier drum 13. Conventional indicator means may be connected with an output of the counter so as to visibly indicate the result of the count either in numbers of cycles or directly in angular degrees.

It may be added that selection of a certain number of cycles between the time reference point and the occurring moment of phase equality, for instance eight cycles according to FIG. 4, with 100% torque serves the purpose of eliminating possible ambiguity with zero torque that may occur if 100% torque were selected at the 10 cycle point which would coincide with the reference point.

The output of the counter may also be directly connected to a conventional digital indicator for readout. However, where a pointer indication of torque is desired the digital signal is transformed to an analogue presentation by means of a digital-analog converter of conventional type.

It can be seen that the operation of the device as described and the result obtained thereby will not be affected by shaft run-out which would cause amplitude modulation.

FIGS. 7–13 refer to an application of the invention for the task of measuring a physical angle of rotary displacement of a member and of transmitting data concerning such an angular displacement in a digital form. Such a method and device would find advantageous use in conjunction with many types of digital computers and automation equipment.

Figure 13:
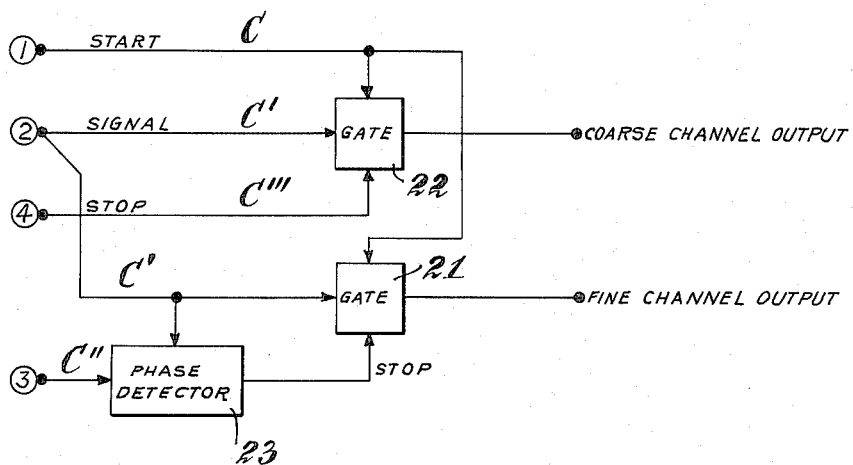

An apparatus for carrying out the method according to the invention is shown by way of example in FIG. 7, FIGS. 12 and 13 illustrating the pertaining circuit arrangements.

A synchronous motor $a$ drives a drum $b$ at a constant speed. The cylindrical surface of the drum $b$ is provided with four magnetically recorded tracks $c$, $c'$, $c''$, $c'''$. Pick-up heads #1, #2 #3 and #4, respectively, are arranged adjacent to and opposite the various tracks thereof. The heads #1 and #2 are mounted stationarily in the housing 20 while the heads #3 and #4 are mounted on a support member $e$ carried by an input shaft $d$ which may be rotated by any type of turning means $f$. The heads #3 and #4 are arranged 180° apart on the member $e$ so that these two heads will be turned simultaneously whenever the shaft $d$ is turned.

Referring to FIGS. 8–10, the track $c$ carries the record of only a single pulse which is picked-up by the stationary head #1 as a single sine wave C. The track $c'$ consists in this example, of the record of 360 pulses equally spaced around the periphery of the drum so that the signal C′ picked-up by the stationary head #2 will appear as illustrated in FIGS. 8–10. The track $c''$ consists of the record of 361 pulses which are picked-up as the signal C″ by the pick-up head #3. Finally, the track $c'''$ consists of the recorded signal of only a single pulse arranged 180° opposite to the signal C recorded on the track $c$ and picked-up by head #4. Since both the heads #3 and #4 are mounted rotatably on the shaft $d$ the pertaining connections are made via slip rings $f'$.

When the shaft $d$ and with it the heads #3 and #4 are in normal or zero position, i.e., at an input angle of 0°00′00″, the relation of the signals C–C‴ is such that they are all in phase with each other at the time reference point. This is shown in FIG. 8. It can be seen also that the duration of the impulse or signal C amounts to a rotation of the input shaft $d$ of 1°0′00″. The same duration applies to the signal C′ because in this example the total number of pulses per revolution is 360. The signal C‴ is identical in duration with the signal C. However, the signal C″ is slightly shorter because in this case 361 pulses are produced per revolution.

FIG. 8 shows the various signals generated in each of the heads #1 to #4 with the drum $b$ continuously rotating at a uniform speed and with the heads #3 and #4 in zero or normal position as shown in FIG. 7.

If now the input shaft $d$ is turned to an angularly displaced position, for instance differing from zero position by 0°00′10″, then the signals C″ and C‴ will shift accordingly because the heads #3 and #4 have been angularly displaced. This situation is illustrated by FIG. 9. The signals C and C′ picked-up by heads #1 and #2 will remain unchanged in their relation. However the signal C″ from head #3 will now be in synchronism with the signal C′ from the head #2 only at the beginning of the second pulse on the track $c'$ counted from the time reference point. The signal C‴ received by head #4 will have shifted 10 seconds of arc from the time reference point.

The indication or measurement of the above mentioned angular displacement of the support member $e$ which means the angular turn of the shaft d can be obtained in the following manner.

FIG. 12 illustrates diagrammatically the connections required for operating the apparatus of FIG. 7 as described above. FIG. 12 appears to be self-explanatory, the signals C, C′, C″, C‴ appearing respectively at the output terminals 1, 2, 3, 4. FIG. 13 shows diagrammatically the remainder of the arrangement namely a first gate device 21 of conventional type connected in circuit with the output terminals 1 and 2 so as to pass the signal C′ to what is indicated as "fine channel output." However, this signal C′ will be passed through the gate 21 only when the starting trigger impulse C is applied to the gate 21. A phase detector 23 is connected in circuit with the output terminals 2 and 3 and with the gate 21 as shown. This phase detector 23 of conventional type will compare the phases of the signals C′ and C″ and whenever phase equality between these two signals occurs an impulse will be emitted from the phase detector 23 to the gate 21 to stop the transmission of the signal C′ to the "fine channel output." It can be seen, therefore, that in the case of FIG. 9 only one full cycle pulse of the signal C1 will be delivered from the gate 21, and this one single pulse will represent 10 seconds of arc.

FIG. 10 illustrates an example where the input angle is 1°00′10″. Again the signals C and C′ from the heads #1 and #2 would remain unchanged. However now the signal from head #4 would be displaced 1°00′10″.

In order to conveniently evaluate this situation the circuit arrangement according to FIG. 13 shows the provision of a fixed gate 22 which is in circuit with the terminals 1, 2, and 4 so as to pass the signal C′ to what is indicated as "coarse channel output" after the trigger signal C from head #1 is applied but to stop this transmission when the signal C‴ from head #4 is applied. It can be seen that in this case only one full cycle pulse would emanate from the gate 22 to the "coarse channel output." However, in addition, a single full cycle pulse would be delivered through gate 21 also from the signal C′. The single pulse delivered by gate 22 would indicate an angular displacement of 1° of arc, while the single pulse delivered from gate 21 would again indicate a displacement of 10 seconds of arc. It will now be understood why the output of gate 21 is called "fine channel output" and the output of gate 22 is called "coarse channel output."

FIG. 11 is a chart indicating, by way of example, in which manner a certain number of pulses counted or delivered from the gates 21 and 22 in the coarse and fine channels would indicate corresponding amounts of angular displacement of the input shaft d.

In this form these serial pulses can be transmitted over long distances or easily converted into a parallel binary code by conventional techniques for computing or read-out as required. Of course, the scale factors may be modified to suit the particular application of the method or device, each pulse representing any desired units of physical angle.

It will be understood that each of the elements described above, or two or more together, may also find a useful application in other types of methods and apparatus for measuring angular displacement of a member differing from the types described above.

While the invention has been illustrated and described as embodied in a method and apparatus for indicating angular displacements of a member by means of a corresponding number of electrical pulses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for measuring angular deviations in a transverse plane of a rotatable member from a reference position determined by a second rotatable member, in combination, signal carrier means mounted on a rotatable member and provided with a first reproduceable signal record determining a first frequency signal upon rotation of said rotatable member at a predetermined speed, a second reproduceable signal record determining a second frequency signal upon rotation of said member at said speed, said second frequency differing by one cycle from said first frequency, and a third reproduceable signal record determining a third signal upon rotation of said member at said speed, said third signal consisting of one impulse for revolution, the start of said impulse coinciding with the start of one of the cycles of said first signal; first and third pick-up means mounted stationarily opposite said first and third signal records, respectively, for being actuated thereby and for delivering said signals, respectively; second pick-up means mounted on a second rotatable member arranged co-axially with said first mentioned rotatable member, said second pick-up means being located opposite said second signal record for being actuated thereby and for delivering said second signal; drive means for rotating said first mentioned rotatable member at a predetermined constant speed; turn means for turning said second rotatable member from a normal reference position to angularly displaced positions for causing, during rotation of said first mentioned rotatable member a time shift between said first and second signals proportional to the angular deviations of the positions of said second rotatable member with respect to said reference position thereof; phase detector means in circuit with said first and second pick-up means, respectively, for comparing the respective phases of said first and second signals and for furnishing an impulse when the phase difference is zero; gate means in circuit with said first pick-up means for delivering at its output pulses furnished by said first signal, and in circuit with said third pick-up means and with said phase detector means for being opened by said third signal for passing said pulses from said first pick-up means, and for being closed by said impulse from said phase detector means, whereby the number of pulses from said first pick-up means appearing within a time unit at the output of said gate means is indicative of the degree of angular displacement of said second rotatable member.

2. An apparatus as claimed in claim 1, wherein said first signal record comprises 360 signal elements evenly distributed over a circular arc of 360° for producing a signal frequency of 360 cycles per revolution, and wherein said second signal record comprises 361 signal elements evenly distributed over a circular arc of 360° for producing a signal frequency of 361 cycles per revolution.

3. An apparatus as claimed in claim 1, wherein said signal carrier means is provided with a fourth reproduceable signal record determining a fourth signal upon rotation of said first mentioned rotatable member at said speed, said fourth signal consisting of one impulse per revolution, the start of said impulse also coinciding with the start of said one of the cycles of said first signal; a fourth pick-up means being mounted on said second rotatable member opposite said fourth signal record in a position 180° offset against the position of said second pick-up means for being actuated by said fourth signal record and for delivering the latter; second gate means in circuit with said first pick-up means for delivering at its output pulses furnished by said first signal, and in circuit with said third pick-up means and with said fourth pick-up means for being opened by said third signal for passing said pulses from said first pick-up means, and for being closed by said fourth signal, whereby the number of pulses from said first pickup means appearing within a time unit at the output of said first gate means is indicative of the degree of angular displacement of said second rotatable member in angular units of a predetermined size, and the number of pulses from said first pick-up means appearing within a time unit at the output of said second gate means is indicative of the degree of angular displacement of said second rotatable member in angular units of a size being a multiple of said predetermined size.

4. An apparatus as claimed in claim 3, wherein said first signal record comprises 360 signal elements evenly distributed over a circular arc of 360° for producing a signal frequency of 360 cycles per revolution, and wherein said second signal record comprises 361 signal elements evenly distributed over a circular arc of 360° for producing a signal frequency of 361 cycles per revolution so that the number of said pulses appearing at the output of said first gate means is indicative of angular displacements in full degrees, while the number of said pulses appearing at the output of said second gate is indicative of angular displacement in seconds of a degree.

References Cited by the Examiner

UNITED STATES PATENTS

| 2,675,700 | 4/54 | Vandergrift et al. | 73—136 |
| 2,732,713 | 1/56 | Willits | 73—136 |

FOREIGN PATENTS 600,980   4/48   Great Britain.

RICHARD C. QUEISSER, *Primary Examiner.*

CHARLES A. CUTTING, *Examiner.*